United States Patent [19]

Ginter, Jr.

[11] 4,180,286
[45] Dec. 25, 1979

[54] EXHAUST PIPE SAFETY CLAMP ASSEMBLY AND COMBINATION

[76] Inventor: Tom Ginter, Jr., Box 193, Clearfield, Ky. 40313

[21] Appl. No.: 905,608

[22] Filed: May 12, 1978

[51] Int. Cl.$^2$ ............................................. F16L 13/14
[52] U.S. Cl. ............................... 285/328; 285/382.2; 285/419; 285/420
[58] Field of Search ............... 285/373, 419, 420, 114, 285/403, 399, 382, 382.2, 253, 328; 24/277, 284

[56] References Cited

U.S. PATENT DOCUMENTS

| 393,400 | 11/1888 | Sharpneck | 285/253 X |
| 609,488 | 8/1898 | Wood | 285/253 |
| 911,250 | 2/1909 | Maggio | 285/253 |
| 1,539,001 | 5/1925 | Steeple | 285/253 |
| 1,733,072 | 10/1929 | Pierce | 285/419 X |
| 4,063,700 | 12/1977 | Brewer | 24/284 X |

FOREIGN PATENT DOCUMENTS

| 2555179 | 6/1977 | Fed. Rep. of Germany | 285/420 |
| 2638586 | 3/1978 | Fed. Rep. of Germany | 285/420 |

*Primary Examiner*—Dave W. Arola
*Attorney, Agent, or Firm*—Karl W. Flocks

[57] ABSTRACT

A clamp assembly for securing two pipe portions of an automobile exhaust system together in lap relationship with each other and the combination thereof, the assembly comprising in combination a rigid bracket having a rigid base plate with two pairs of rigid upstanding flanges extending from one side thereof, each of the flanges having a generally concave cut-out for reception of an approximately semi-circular portion of a pipe element, one of the pairs of flanges being disposed adjacent one end of the base plate, the other of the pairs of flanges being disposed adjacent the end of the base plate opposite from the one end, the base plate having a first pair of holes located between the one pair of flanges and a second pair of holes located between the other of the pairs of flanges, a first U-shaped bolt disposed between the one pair of flanges and having ends thereof extending through the first pair of holes, a second U-shaped bolt disposed between the other of the pairs of flanges and having ends thereof extending through the second pair of holes, the first and second U-shaped bolts each having a bight portion adapted to embrace a side of a pipe element opposite from the side that would be received on the concave cut-out of the upstanding flanges, and securing elements applying pressure to and securing the U-shaped bolts at the ends thereof.

6 Claims, 5 Drawing Figures

EXHAUST PIPE SAFETY CLAMP ASSEMBLY AND COMBINATION

BACKGROUND OF THE INVENTION

1. Field of the Invention

The field of the invention disclosed and claimed herein is believed to be best exemplified by art which may be found in the United States Patent Office in Class 285, Subclasses 253, 382, 382.1, 382.2, and 420 in which a priliminiary search has been conducted.

2. Description of the Prior Art

The prior listed below was developed in an endeavor to ascertain patentable merit in the present invention, U.S. Pat. Nos.

166,735—WALWORTH
911,250—MAGGIO
1,765,221—FALLA
2,166,524—GOODALL
2,963,305—MILLER
3,107,931—KILLIAN
3,249,371—PETERMAN
3,432,190—KUNZ
3,572,778—CASSEL
3,900,933—ENGMAN et al
4,056,273—CASSEL

Of the art listed above, Miller is of interest in that it shows a lap joint relationship between pipes 13 and 14 with clamping ring 5 around both pipes 13 and 14 over lapped portions thereof, clamping ring 6 around an unlapped portion of pipe 14 adjacent the end of pipe 13, and member (19, 20, 21) interconnecting rings 5 and 6. The interconnecting member (19, 20, 21) being elongate and of relatively small in diametric dimension is highly suspect of low rigidity.

The Maggio and Cassel ('778) patents are of interest in that they show the use of U bolts in combination with cross bars to clamp the lap portions of pipe sections. In Maggio spacer member g is a thin sheet of metal or leather.

The Walworth patent is of interest in that a pipe coupling member B includes serrations on the inner surface thereof to grip the pipe sections A, A'.

The Falla patent is of interest in that it also discloses pipe couplings in which the clamps are interconnected, the interconnecting member 13 having little circumferential dimension appears to provide only minimal rigidity.

The Goodall, Killian, Kunz, Peterman, Engman et al and Cassel ('273) are of general interest only.

SUMMARY OF THE INVENTION

The present invention was conceived by applicant as a result of his awareness of dangerous and/or potentially dangerous conditions of automotive exhaust systems. These dangerous conditions leading to the development of the present invention frequently appear to be the result stresses to which exhaust pipe joints are subjected. In this regard during the day-to-day operation of a car the exhaust system normally is subjected to various stresses which tend to pull, push, and twist the pipe joints and if the joints are not rigidly secured the stress is amplified by vibration both rectilinear and torsional in nature which tend to pull the pipe joint apart and produce dangerous exhaust leaks which could reach the passenger area.

With the foregoing problem in mind, applicant has developed the present invention with the object of providing safe clamping structure for exhaust pipe joints.

In particular it is an object of this invention to provide a clamp assembly for automobile exhaust pipe elements which would under ordinary use not allow the pipe elements to be pulled apart.

It is another object of this invention to provide a two-in-one or two-fold clamping structure for joints of automotive exhaust systems.

It is yet another object of this invention to provide rigid means for securely holding together the pipes forming a joint of an automotive exhaust system.

It is a further object of this invention to provide a clamping arrangement whereby spaced-apart exhaust pipe portions are held together securely.

It is moreover an object of this invention to provide an exhaust system wherein the pipe elements forming a joint are held in both secure and rigid relationship with each other for safety.

Other objects and advantages of the present invention will be readily discernible to the reader upon closer examination of the following description taken in conjunction with the accompanying drawings.

BRIEF DESCRIPTION OF THE DRAWINGS

Referring briefly to the drawings, the reader will readily visualize the preferred embodiment of the present invention wherein.

DETAILED DESCRIPTION OF THE INVENTION

Figure 1:
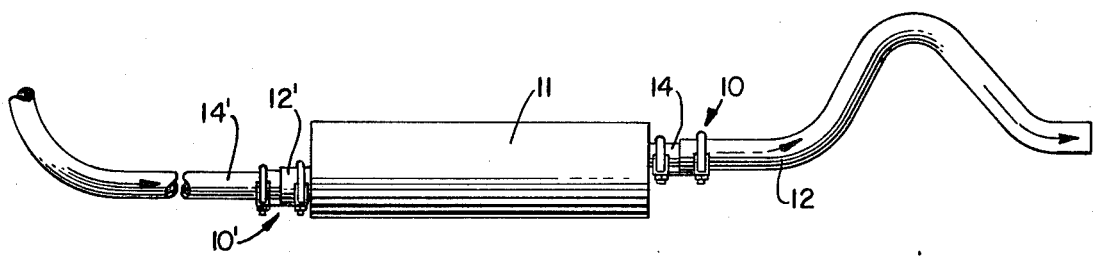
FIG. 1 represents a side elevational view of a connection between the exhaust pipe and the muffler and a connection between the muffler and the tail pipe of a motor vehicle exhaust system utilizing the clamp assembly according to the invention disclosed herein.

Referring now to the drawings with greater particularity, the reader will readily appreciate from FIG. 1 that according to the inventive concept disclosed and claimed herein a clamp assembly 10 is applied to two pipe elements 12, 14 of an automobile exhaust system. Pipe element 12, for example, may be part of the tail pipe while pipe element 14 may be a connecting sleeve extending from a muffler 11. As is apparent from FIGS. 2 and 4 pipe element 12 extends around pipe element 14 in lapped, telescopic relationship therewith. Consistent with the objects set forth hereinabove clamp assembly 10 is applied to the connection of pipe elements 12, 14 to provide a secure and safe connection, one which will not be pulled or twisted apart. To this end clamp assembly 10, as clearly illustrated in FIGS. 2-5 comprises a bracket 16 having a base plate 18 with two pairs of upstanding flanges 20, 22 extending from one side 24 of the plate 18. Flanges 20, 22 may be readily seen in FIGS. 3-5 to be substantially fully coextensive with plate 18 for the entire lateral width of plate 18, particularly at the bases of flanges 20, 22 where they are integral with plate 18. Because of the foregoing relationship between plate 18 and each of the flanges 20, 22, clamp assembly 10 will inherently obtain maximum resistance against twist for whatever material is selected for the construction. Each flange 20 is formed with a generally concave cut-out 26, which may be seen in FIG. 3, while each flange 22 is formed with a similarly, generally concave cut-out 27, which may be seen in FIG. 5. It is to be understood that the cut-outs 26 and 27 preferably are to be semi-circular and substantially coaxial, but with cut-outs 26 being formed with a slightly larger radius than cut-out 27 is formed with for reasons which will be obvious as set forth hereinbelow.

Before clamp assembly 10 can be applied to effect the intended purpose thereof, a male pipe element 14 is inserted into a female pipe element 12 which is of a slightly greater diametric dimension, the two pipe elements 12, 14 thus being put in lapped, telescopic relationship with each other. As is clear from FIGS. 2 and 4 while a substantial portion of pipe element 14 is inserted into pipe element 12, a portion of pipe element 14 adjacent to where it is integral with muffler 11 remains exposed and out of pipe element 12. As would be expected in any exhaust system pipe element 14 is received in pipe element 12 in a snug fit therein. Bracket 16 can with pipe elements 12 and 14 fitted to each other as described above then be applied to the fitting. As applied to pipe elements 12, 14, bracket 16 is placed to one side, preferably the underside of pipe elements 12, 14 so that upstanding flanges 20 adjacent one end 28 of plate 18 straddle the lower circumference of pipe element 12 while upstanding flanges 22 adjacent the other end 30 of plate 18 straddle the lower circumference of pipe element 14. Because pipe elements 12, 14 are in telescopic relationship with each other, it can be readily understood that pipe element 12 while being coaxial with pipe element 14 has a smaller diameter than the latter. From the foregoing it is apparent as to why cut-outs 26 are formed of slightly larger radius than cut-outs 27, but coaxial therewith as described above. The dimensional differences between cut-outs 26, 27 and the coaxial relationship therebetween is obviously to accommodate the diametric differences of pipe elements 12, 14 respectively, and to effect a clamping assembly with a minimum skewness or non-parallelism between parts.

Figure 2:
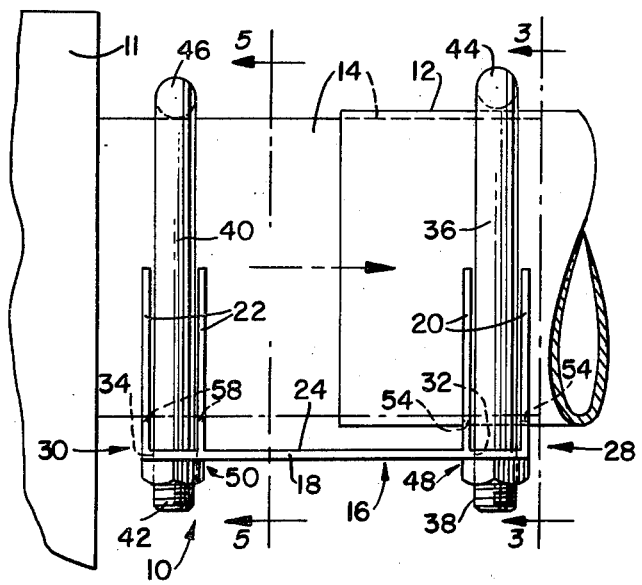
FIG. 2 is an enlarged view of the connection at the right end of the muffler of FIG. 1.
Figure 3:
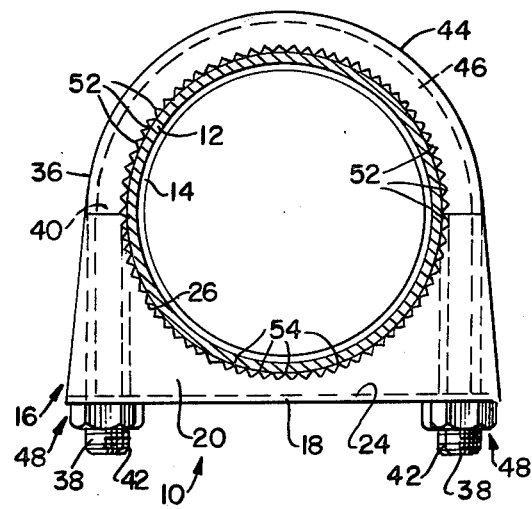
FIG. 3 is a sectional view taken along the plane 3—3 in FIG. 2.
Figure 4:
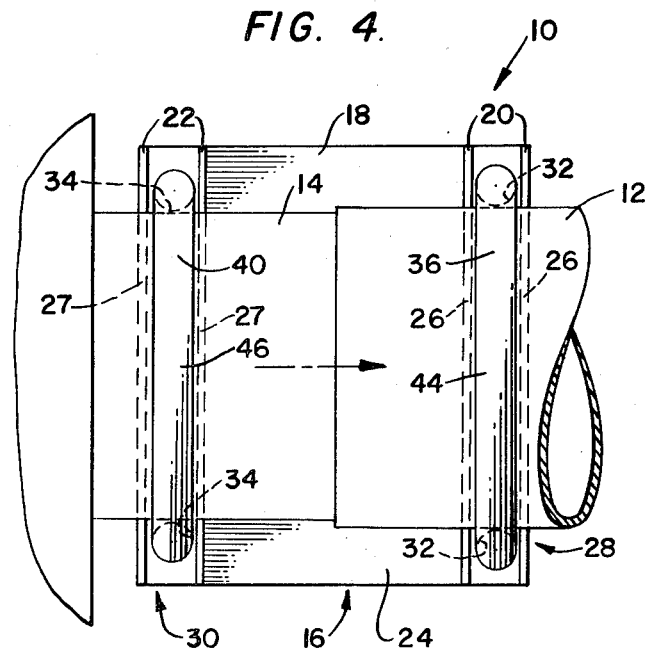
FIG. 4 is a top plan view of the connection illustrated in FIG. 2.
Figure 5:
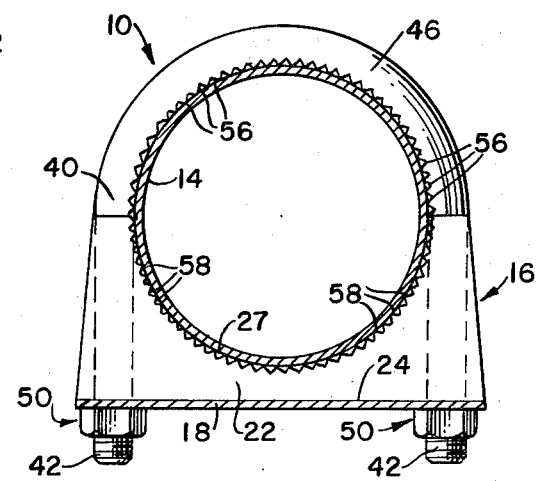
FIG. 5 is a sectional view taken along the plane of 5—5 in FIG. 2.

Once bracket 16 is properly located a pair of U-shaped bolts 36, 38 may be combined with bracket 16. To accommodate U-shaped bolt 36 base plate 18 is provided with a pair of holes 32 disposed between the pair of upstanding flanges 20 adjacent end 28 of bracket 16. Similarly, a second pair of holes 34 is disposed between upstanding flanges 22 adjacent the other end 30 of bracket 16. As can be seen in FIGS. 2 and 3 U-shaped bolt 36 is applied to the pipe connection with its bight portion 44 extending around the side of pipe element 12 opposite from the side embraced by flanges 20. Also, as can be seen in FIGS. 2 and 4 U-shaped bolt 36 extends downwardly between the two flanges 20 adjacent end 28 and through holes 32. Flanges 20 and U-shaped bolt 36 are applied to pipe element 12 over an area surrounding pipe element 14 in lapped, telescopic relationship. U-shaped bolt 40 is applied to the pipe connection so that it embraces pipe element 14 adjacent end 30 of bracket 16 at a substantial distance from U-shaped bolt 36. U-shaped bolt 40 in fact is applied to the exposed surface of pipe element 14 opposite from cut-outs 27 of flanges 22 and closely adjacent to muffler 11 from which pipe element 14 extends integrally. The location of U-shaped bolt 40 is further seen to be with its bight portion 46 extending around the side of pipe element 14 away from cut-outs 27 and with legs extending between flanges 22 and through holes 34. U-shaped bolts 36 and 40 include threaded portions 38 and 42, respectively, adjacent the free ends extending through holes 32 and 34 underneath base plate 18 to which pressure applying means in the form of nuts 48 and 50, may be threaded to securely draw U-bolts 36, 40 and bracket 16 together to effect the clamp assembly 10. To ensure a firm gripping of pipe elements 12, 14 U-shaped bolts 36, 40 are provided with radially inwardly directed teeth 52, 56, notches, serrations or the like on the inner periphery of bight portions 44, 46, respectively, and radially inwardly directed teeth 54, 58, notches, serrations or the like are provided along at least a portion of the expanse of the arcs of cut-outs 26, 27, respectively. Upon application of a suitable number of turns of nuts 48 and 50 on threaded portions 38 and 42, teeth 52 and 54 and teeth 56 and 58 will grip pipe elements 12 and 14 firmly to effect a safe clamp assembly 10 for the exhaust system as disclosed herein. At the other end of muffler 11 from clamp assembly 10 illustrated in FIG. 1 a similar clamp assembly 10' may be applied to a female pipe element 12' extending from muffler 11 and a male pipe element 14' extending, for example, from an exhaust manifold into female pipe element 12'. The arrows in pipe elements 14' and 12 show that exhaust flow in the arrangement illustrated in FIG. 1 is from left to right.

It will be obvious to those skilled in the art that various changes may be made without departing from the scope of the invention and therefore the invention is not limited to what is shown in the drawings and described in the specification but only as indicated in the appended claims.

What is claimed is:

1. A clamp assembly for securing two pipe portions of an automobile exhaust system together in overlapping relationship with each other, said assembly comprising in combination a rigid bracket having a rigid base plate of substantially constant width with two pairs of rigid upstanding flanges extending from one side thereof, each of said flanges being substantially fully coextensive with said plate for the entire lateral width of said base plate and each of said flanges having a generally concave cut-out for reception of an approximately semi-circular portion of a pipe element, one of said pairs of flanges being disposed adjacent one end of said base plate, the other of said pairs of flanges being disposed adjacent the end of said base plate opposite from said one end, said base plate having a first pair of holes located between said one pair of flanges and a second pair of holes located between the other of said pairs of flanges, a first U-shaped bolt disposed between said one pair of flanges and having ends thereof extending through said first pair of holes, a second U-shaped bolt disposed between the other of said pairs of flanges and having ends thereof extending through said second pair of holes, said first and second U-shaped bolts each having a bight portion adapted to embrace a side of a pipe element opposite from the side that would be received on the concave cut-out of the upstanding flanges, and means for applying pressure to and securing said U-shaped bolts at the ends thereof.

2. A clamp assembly as defined in claim 1 wherein the cut-outs of said one pair of flanges are generally coaxial with each other and have generally equal radii of curvature, the cut-outs of said other pair of flanges are also generally coaxial with said cut-outs of said one pair of flanges and have radii of curvature generally equal to that of each other but different from the radii of curvature of said one pair of flanges whereby said one pair of flanges and said other pair of flanges will accommodate coaxially extending pipe elements having different size diameters.

3. A clamp assembly as defined in claims 1 or 2 wherein said cut-outs include serrated edge portions for gripping contact with a portion of a pipe element.

4. A clamp assembly as defined in claim 3 wherein said bight portions include serrations for securely gripping a portion of a pipe element.

5. A clamp assembly as defined in claim 3 wherein said means for applying pressure to and securing said U-shaped bolts comprise screw threads extending around distal portions of said U-shaped bolts adjacent the ends thereof and nuts engaged around said threads on the side of said base plate opposite from said one side from which said upstanding flanges extend.

6. A clamp assembly as defined in claim 3 in combination with a first pipe element of an automobile exhaust system and a second pipe element of the exhaust system, said first pipe element having an end portion extending around an end portion of said second pipe element, said second pipe element including an exposed portion extending out of said first pipe element, characterized by said first U-shaped bolt and the cut-outs of said one of said pairs of flanges cooperatively extend in firm clamping relationship around opposite sides of said end portion of said first pipe element extending around said end portion of said second pipe element and said second U-shaped bolt and the cut-outs of said other of said pairs of flanges cooperatively extend in firm clamping relationship around opposite sides of said exposed portion of said second pipe element.

* * * * *